(12) United States Patent
Manevich et al.

(10) Patent No.: US 11,831,666 B2
(45) Date of Patent: Nov. 28, 2023

(54) BLOCKCHAIN DATA BREACH SECURITY AND CYBERATTACK PREVENTION

(71) Applicant: International Business Machines Corporation, Armonk, NY (US)

(72) Inventors: Yacov Manevich, Beer Sheva (IL); Artem Barger, Haifa (IL); Nitin Gaur, Round Rock, TX (US); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 17/226,309

(22) Filed: Apr. 9, 2021

(65) Prior Publication Data
US 2022/0337607 A1 Oct. 20, 2022

(51) Int. Cl.
*H04L 9/40* (2022.01)
*H04L 9/30* (2006.01)
(Continued)

(52) U.S. Cl.
CPC .......... *H04L 63/1425* (2013.01); *G06N 5/04* (2013.01); *G06N 20/00* (2019.01); *H04L 9/30* (2013.01); *H04L 9/50* (2022.05)

(58) Field of Classification Search
CPC ......... H04L 63/1425; H04L 9/30; H04L 9/50; H04L 9/3247; G06N 5/04; G06N 20/00
See application file for complete search history.

(56) References Cited

U.S. PATENT DOCUMENTS 9,882,918 B1  1/2018  Ford
10,250,395 B1 4/2019 Borne-Pons
(Continued)

FOREIGN PATENT DOCUMENTS

WO      2019010065 A1    1/2019

OTHER PUBLICATIONS

Li, J., Gu, C., Wei, F., Chen, X. (2020). A Survey on Blockchain Anomaly Detection Using Data Mining Techniques. In: Zheng, Z., Dai, HN., Tang, M., Chen, X. (eds) Blockchain and Trustworthy Systems. BlockSys 2019. Communications in Computer and Information Science, vol. 1156. Springer, Singapore. (Year: 2019).*

(Continued)

*Primary Examiner* — Robert B Leung
(74) *Attorney, Agent, or Firm* — Gilbert Harmon, Jr.; Christopher M. Pignato

(57) ABSTRACT

Systems, methods, and computer programming products leveraging the use of machine learning, cryptographic keys and blockchain technology for validating blockchain transactions. The disclosed systems, methods and products improve detection of malicious cyberattacks and fraud, while reducing occurrences of falsely invalidated transactions and improving overall blockchain security in both permissioned and permissionless blockchain networks. Classifiers are trained using machine learning and other classification techniques by building a transaction history to learn how to identify suspicious transactions on the blockchain. In permissionless and order-execute models of permissioned blockchains, cryptographic keys are publicly registered to guardians residing out of band, who may co-sign requests and override or resubmit transactions marked as suspicious by the classifiers. In an execute-order model of permissioned blockchains, one-time use keys may be registered with the certificate authority of the blockchain, and used to co-sign transactions that might appear suspicious, preventing false-positive identification of suspicious-looking transactions by the classifier.

20 Claims, 11 Drawing Sheets

(51) Int. Cl.
  *G06N 20/00* (2019.01)
  *H04L 9/00* (2022.01)
  *G06N 5/04* (2023.01)

(56) References Cited

U.S. PATENT DOCUMENTS

| | | | |
|---|---|---|---|
| 10,262,505 | B1 | 4/2019 | Gopalakrishna |
| 10,380,594 | B1* | 8/2019 | Bayer .................. G06F 16/951 |
| 10,621,579 | B2 | 4/2020 | Perullo |
| 2015/0363777 | A1 | 12/2015 | Ronca |
| 2017/0230189 | A1* | 8/2017 | Toll ...................... G06F 21/602 |
| 2017/0317997 | A1* | 11/2017 | Smith ................ G06Q 20/3829 |
| 2017/0344988 | A1* | 11/2017 | Cusden .................. H04L 63/12 |
| 2019/0012249 | A1* | 1/2019 | Mercuri ................. G06F 9/542 |
| 2019/0229921 | A1 | 7/2019 | Pulsifer |
| 2019/0296920 | A1* | 9/2019 | Uhr ........................ H04L 63/18 |
| 2019/0303920 | A1* | 10/2019 | Balaraman .............. H04L 63/12 |
| 2019/0311367 | A1 | 10/2019 | Reddy |
| 2019/0392439 | A1 | 12/2019 | Perullo |
| 2020/0193432 | A1 | 6/2020 | Millar |
| 2020/0195663 | A1 | 6/2020 | Achituve |
| 2020/0202343 | A1 | 6/2020 | Shi |
| 2020/0267163 | A1 | 8/2020 | Wilson |
| 2020/0372154 | A1* | 11/2020 | Bacher ................. H04L 41/145 |
| 2020/0382279 | A1 | 12/2020 | Jayachandran |
| 2021/0397891 | A1* | 12/2021 | Memon ............... G06F 18/2148 |
| 2022/0086131 | A1* | 3/2022 | Kinai ..................... G06N 20/00 |

OTHER PUBLICATIONS

H. Baek, J. Oh, C. Y. Kim and K. Lee, "A Model for Detecting Cryptocurrency Transactions with Discernible Purpose," 2019 Eleventh International Conference on Ubiquitous and Future Networks (ICUFN), Zagreb, Croatia, 2019, pp. 713-717, doi: 10.1109/ICUFN.2019.8806126. (Year: 2019).*

A. Kinai, F. Otieno, N. Bore and K. Weldemariam, "Multi-factor authentication for users of non-internet based applications of blockchain-based platforms," 2020 IEEE International Conference on Blockchain (Blockchain), Rhodes, Greece, 2020, pp. 525-531, doi: 10.1109/Blockchain50366.2020.00076. (Year: 2020).*

"A Comprehensive List of Cryptocurrency Exchange Hacks", Selfkey, Feb. 13, 2020, 15 pages, <https://selfkey.org/list-of-cryptocurrency-exchange-hacks/>.

Akcora et al., "BitcoinHeist: Topological Data Analysis for Ransomware Detection on the Bitcoin Blockchain", arXiv:1906.07852v1 [cs.CR], Jun. 19, 2019, 15 pages.

Camino et al., "Finding Suspicious Activities in Financial Transactions and Distributed Ledgers", DOI: 10.1109/ICDMW.2017.109, Nov. 2017, 11 pages.

Hardjono et al., "Anonymous Identities for Permissioned Blockchains", Draft v06C-112412016, 16 pages.

Mell et al., "The NIST Definition of Cloud Computing", Recommendations of the National Institute of Standards and Technology, Special Publication 800-145, Sep. 2011, 7 pages.

Preuveneers et al., "Chained Anomaly Detection Models for Federated Learning: An Intrusion Detection Case Study", Appl. Sci. 2018, 8, 2663; doi.10.3390/app8122663, Published: Dec. 18, 2018, 21 pages.

Sayadi et al., "Anomaly Detection Model Over Blockchain Electronic Transactions", 2019 15th International Wireless Communications and Mobile Computing Conference (IWCMC), Jun. 2019, Tangier, France, 7 pages.

Signorini et al., "BAD: a Blockchain Anomaly Detection Solution", arXiv:1807:03833v3 [cs.CR], Jul. 3, 2020, 14 pages.

* cited by examiner

US 11,831,666 B2

BLOCKCHAIN DATA BREACH SECURITY AND CYBERATTACK PREVENTION

TECHNICAL FIELD

The present disclosure relates generally to the field of data security, and more specifically, the security of blockchains and the prevention of malicious attacks or theft of assets that are tracked and recorded by blockchains.

BACKGROUND

Blockchain is a shared, immutable ledger that facilitates the process of recording transactions and tracking assets in a business network. An asset can be tangible (a house, car, cash, land) or intangible (intellectual property, patents, copyrights, branding). Virtually anything of value can be tracked and traded on a blockchain network. Blockchain is ideal for delivering that information because it provides immediate, shared and completely transparent information stored on an immutable ledger, where participants have access to the distributed ledger and its immutable record of transactions. With this shared ledger, transactions are recorded only once, eliminating the duplication of effort that is typical of traditional business networks. While blockchain technology produces a tamper-proof ledger of transactions, blockchain networks are not immune to cyberattacks and fraud. Those with ill intent can manipulate known vulnerabilities in blockchain infrastructure and have succeeded in various hacks and frauds over the years. The resulting asset theft from these hacks has resulted in tens of millions of dollars to hundreds of millions in damages in some instances.

SUMMARY

Embodiments of the present disclosure relate to a computer system, an associated computer program product and a computer-implemented method for validating blockchain transactions and detecting requests that are fraudulent or suspicious. The computer system comprises a processor and a computer-readable storage media coupled to the processor, wherein the computer-readable storage media contains program instructions executed by the processor. The program instructions being executed include registering a set of public keys corresponding to a set number of transactions; training a classifier with a pattern recognition algorithm to detect anomalies indicating suspicious blockchain transactions, using the set number of transactions to build a transaction history; receiving the blockchain transaction; and inspecting the blockchain transaction using the classifier trained to detect the anomalies indicating the suspicious blockchain transactions, wherein upon identifying the blockchain transaction is classified as a suspicious blockchain transaction and the blockchain transaction classified as the suspicious blockchain transaction is co-signed by a public key registered as part of the set of public keys, the blockchain transaction is accepted.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
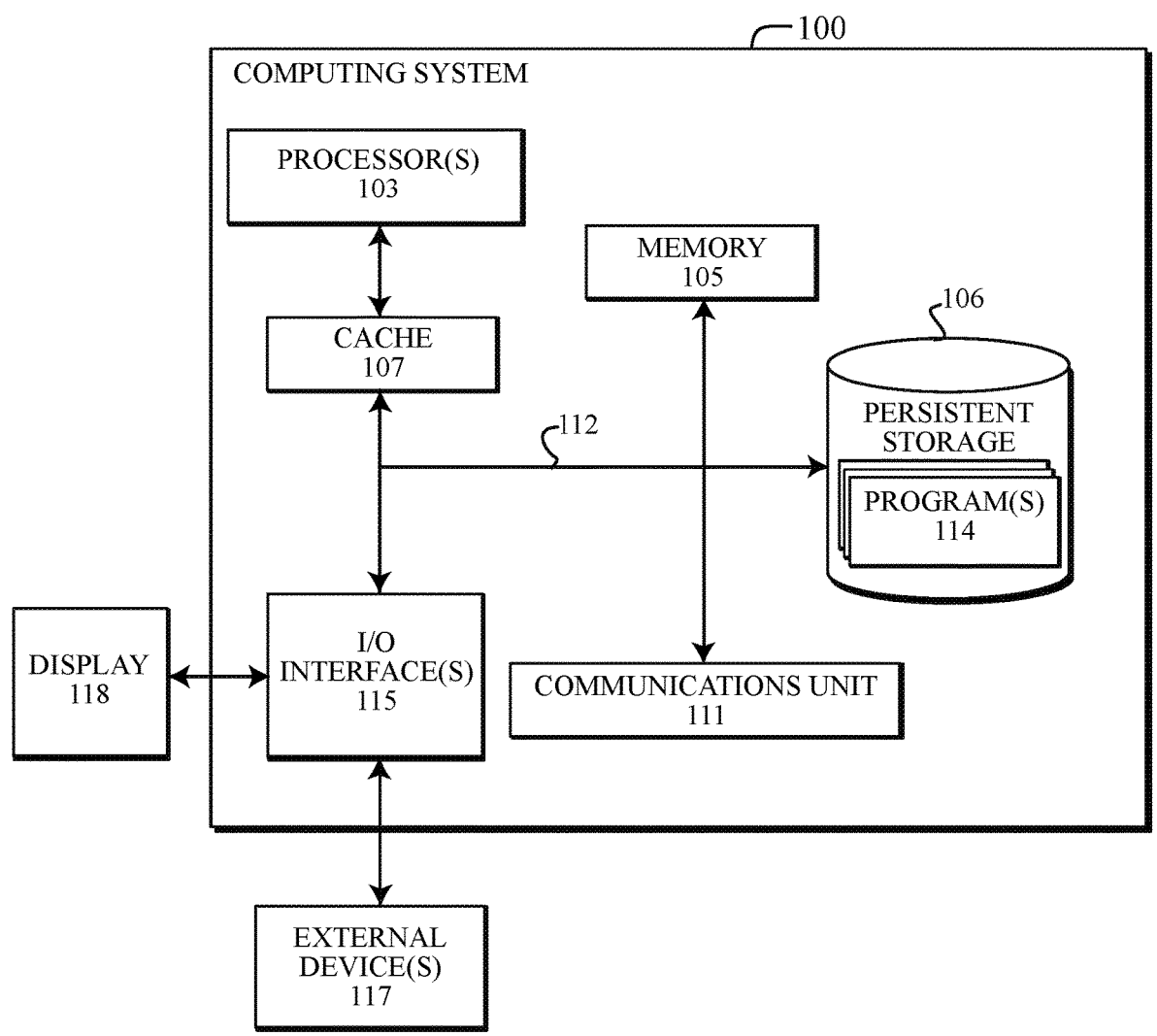
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Breaches of blockchain security have happened on a frequent basis over the years, and the aftermath of the some of these breaches have seen devastating results. For example, in 2019 alone, twelve different cryptocurrency exchanges were victims of cyberattacks that included over $300 million dollars in damages. Likewise, in 2011, the Mt. Gox cryptocurrency exchange was the victim of a cyberattack and fraud that resulted in private keys being stolen. Over the course of two years, more than 630,000 bitcoins were moved from the victims' wallets to wallets controlled by the attackers. Some of the most common exploits of cryptocurrency exchanges are the security systems implemented to monitor the blockchain transactions. During the Mt. Gox incident, a computer exploit caused security systems of the currency exchange to interpret withdrawals of cryptocurrency as deposits, allowing the attacks to remain undetected and continue for nearly two years. There is a need for security measures that prevent cyberattacks and fraud from exploiting weaknesses in the computer systems that transact on the blockchain, by leveraging features of the blockchain itself to detect and block the malicious activity.

The embodiments of the present disclosure leverage the use of anomaly detection mechanisms such as pattern recognition techniques, artificial intelligence, and machine learning, to detect suspicious and malicious blockchain transaction activity based on individualized histories of blockchain users making requests on the blockchain network. Embodiments of the anomaly detection mechanisms are able to block the suspicious activity using the blockchain itself, by incorporating a classifier, trained to detect suspicious blockchain transactions using the anomaly detection mechanisms described herein, into the blockchain's transaction procedures and policies. Embodiments of the classifier that detect suspicious blockchain transactions are able to mark the blockchain transactions as invalid and prevent the blockchain from completing the potentially fraudulent transaction.

Embodiments of the present disclosure recognize that pattern recognition techniques and other anomaly detection mechanisms that may be used to train a classifier are not always 100% accurate. In some situations, even the best trained classifiers may falsely identify a legitimate blockchain request as being suspicious. Embodiments of the present disclosure may prevent the false-positive classification of a blockchain request as being "suspicious" by further incorporating additional approval techniques that may override the classifications ascribed by the classifier during validation of the blockchain request by the blockchain network. The type of additional approval techniques may vary depending on the type of blockchain network being used to fulfill the blockchain request. For example, blockchains operating in a permissionless blockchain environment, or an order-execute model of a permissioned blockchain environment, may incorporate the use of guardian parties trusted by the requester of the blockchain request. Requesters may send an out of band request to one or more guardians to co-sign the blockchain request with the guardian's key. A co-signed request submitted to the blockchain network comprising a guardian's key may override the classifier's "suspicious" classification and allow the blockchain to mark the blockchain request as valid and complete the transaction being requested.

In alternative embodiments, where the blockchain network operates using an execute-order model of a permissioned blockchain environment, interacting with a trusted third party, such as a guardian, to co-sign as blockchain transaction may not be feasible. Instead, embodiments of the present disclosure may implement non-interactive solutions for co-signing blockchain transactions that may be falsely identified by the classifier as "suspicious". For example, in exemplary embodiments, one-time use key pairs can be generated that may be used one-time each, to co-sign blockchain transactions and override a suspicious classification of a blockchain request, allowing the legitimate blockchain request to be validated and completed. Under such an embodiment, the public key of the key pair can be registered with the certificate authority of the permissioned blockchain, while the private keys may be stored offline, outside of the blockchain network. blockchain transactions signed by a valid, one-time use private key, are validated by the blockchain network, executing the transaction, and updating the ledger to reflect the transaction's completion.

Computing System

FIG. 1 illustrates a block diagram of an embodiment of a computing system 100, which may be a simplified example of a computing device (i.e., a physical bare metal system or virtual system) capable of performing the computing operations described herein for validating blockchain transactions and detecting requests that are classified fraudulent or suspicious by a trained classifier. Computing system 100 may be representative of the one or more computing systems or devices implemented as part of computing environments depicted in FIGS. 2A-4B, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, and microservice-oriented architecture. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals, or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Validating Blockchain Transactions

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may be used in the description of embodiments, the application may be applied to many types of networks and data. Furthermore, while certain types of connections, messages, and signaling may be depicted in exemplary embodiments, the application is not limited to a certain type of connection, message, and signaling.

Moreover, while the terms "transaction", "transaction proposal", "proposal" or "request" may be used throughout this description, it is noted that these terms may be interchangeable and may be synonymous with (unless otherwise noted) a blockchain transaction, blockchain proposal, or blockchain request, which should not be construed as a business or financial transaction. The term "transaction proposal" or "blockchain request" within a blockchain environment may refer to a proposal to commit data to the blockchain and the term "transaction" within a blockchain environment, may refer to a commitment of data to a blockchain or an execution of a smart contract code that can be performed in response to conditions associated with the smart contract being satisfied.

Embodiments of the present disclosure may utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers, nodes, and/or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments described herein, a permissioned and/or permissionless blockchain may be utilized. In a public, or permissionless, blockchain, anyone can participate without a specific identity (e.g., retaining anonymity) or presenting credentials authorizing participation. Public blockchains can involve native cryptocurrency and use a consensus based on various protocols such as Proof of Work. On the other hand, a permissioned blockchain database provides secure interactions among a group of entities which share a common goal, but which do not fully trust one another, such as businesses that exchange funds, goods, (private) information, and the like.

Figure 2A:
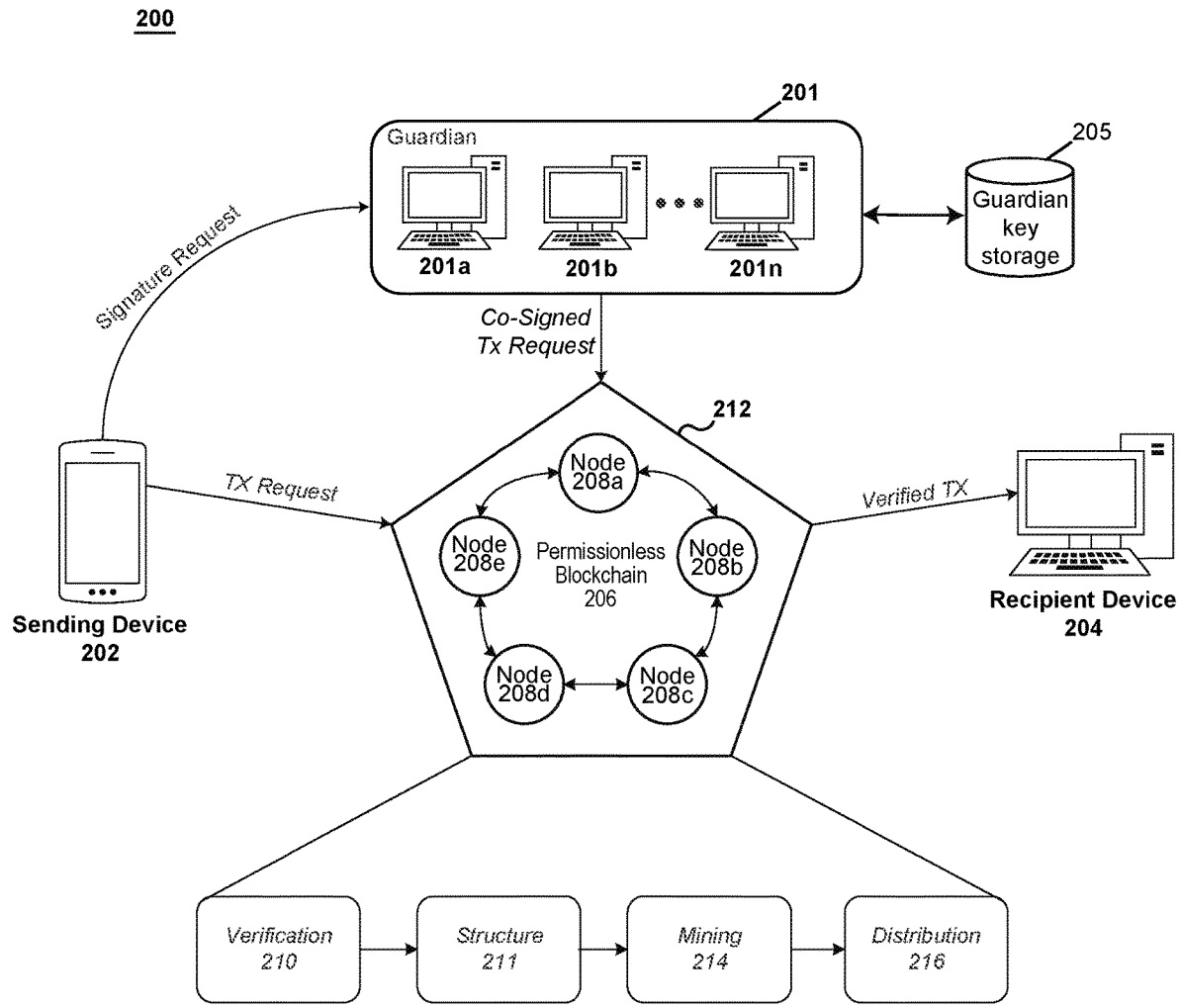
FIG. 2A depicts a functional block diagram describing an embodiment of a permissionless blockchain network, in accordance with the present disclosure.

Referring to the drawings, FIG. 2A illustrates an exemplary embodiment of a permissionless blockchain environment 200 comprising a permissionless blockchain network 206. The permissionless blockchain network 206 features a distributed, decentralized peer-to-peer architecture comprising a plurality of nodes 208a-208e (referenced herein generally as "nodes 208"). In a permissionless blockchain environment 200, anyone can join the permissionless blockchain network 206 and participate in performing functions of the permissionless blockchain 206. For example, to join a permissionless blockchain network 206, a user may create a personal address and begin interacting with the permissionless blockchain network 206, by submitting transaction proposals or "blockchain transactions", and hence adding entries to the ledger. Additionally, all parties have the choice of running a node on the system and employing the mining protocols to help verify transactions. As shown in FIG. 2A, in addition to the plurality of nodes 208, an embodiment of a permissionless blockchain environment 200 may further include a least one blockchain user submitting a request to complete a transaction on the permissionless blockchain 206, using a sending device 202, a recipient device 204 receiving one or more assets resulting from the completion of the verified blockchain transaction and/or one or more guardians 201a-201n (hereinafter referred to generally as "guardians 201"), who may be a third party entrusted by the blockchain user of the sending device 202 to co-sign a transaction, out of band, using a cryptographic key, which may be stored outside of the permissionless blockchain network 206 within guardian key storage 205.

Figure 2B:
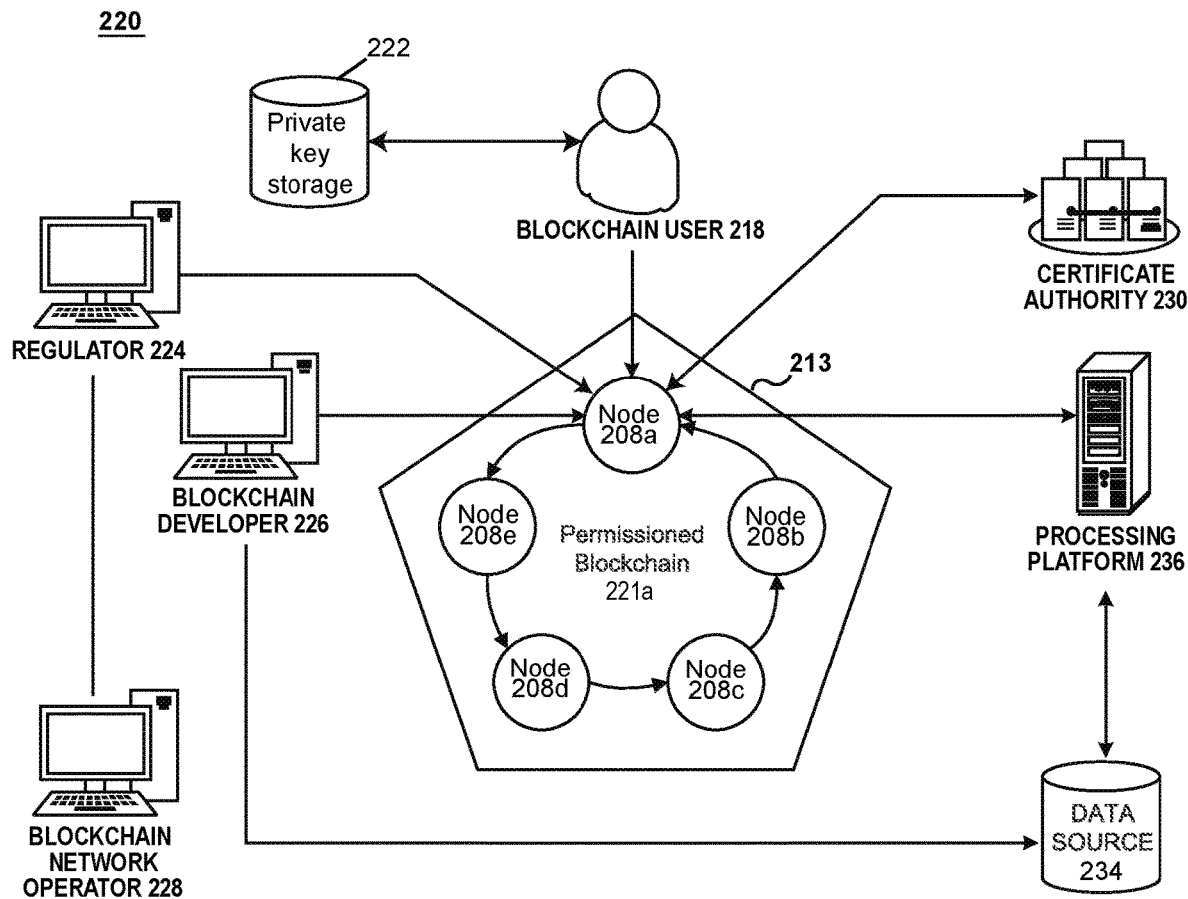
FIG. 2B depicts a functional block diagram describing an embodiment of a permissioned blockchain network, in accordance with the present disclosure.

FIG. 2B illustrates an embodiment of a permissioned blockchain environment 220, which, similar to the permissionless blockchain environment 200 mentioned above, permissioned blockchains also features a distributed, decentralized peer-to-peer architecture. In a permissioned blockchain environment 220, a blockchain user 218 that is authorized to transact on the permissioned blockchain network 221a may initiate a transaction with a request (or proposal) to the permissioned blockchain 221a, 221b. The transaction proposal can be a request to deploy, invoke, or query the blockchain and may be issued through a client-side application leveraging an SDK, directly through an API, etc. Permissioned blockchain networks 221a, 221b may provide access to a regulator 224, such as an auditor, and a blockchain network operator 228 may manage member permissions, such as enrolling the regulator 224 as an "auditor" and adding the blockchain user 218 as an authorized "client". In some embodiments, an auditor could be restricted only to querying the ledger whereas a client could be authorized to deploy, invoke, and query certain types of chain code.

Embodiments of the permissioned blockchain environment 220 may also include a blockchain developer 226 that may write chain code and client-side applications. The blockchain developer 226 can deploy chain code directly to the network through an interface. To include credentials from a traditional data source 234 in chain code, the blockchain developer 226 could use an out-of-band connection to access the data. In this example, the blockchain user 218 connects to the permissioned blockchain 221a through a peer node 208a. Before proceeding with any transactions, the peer node 208a may retrieve the user's enrollment and transaction certificates from a certificate authority 230, which manages user roles and permissions. In some cases, blockchain users must possess these digital certificates in order to transact on the permissioned blockchain 221a, 221b. Meanwhile, a user attempting to utilize chain code may be required to verify their credentials on the traditional data source 234. To confirm the user's authorization, chain code can use an out-of-band connection to this data through a traditional processing platform 236.

Figure 2C:
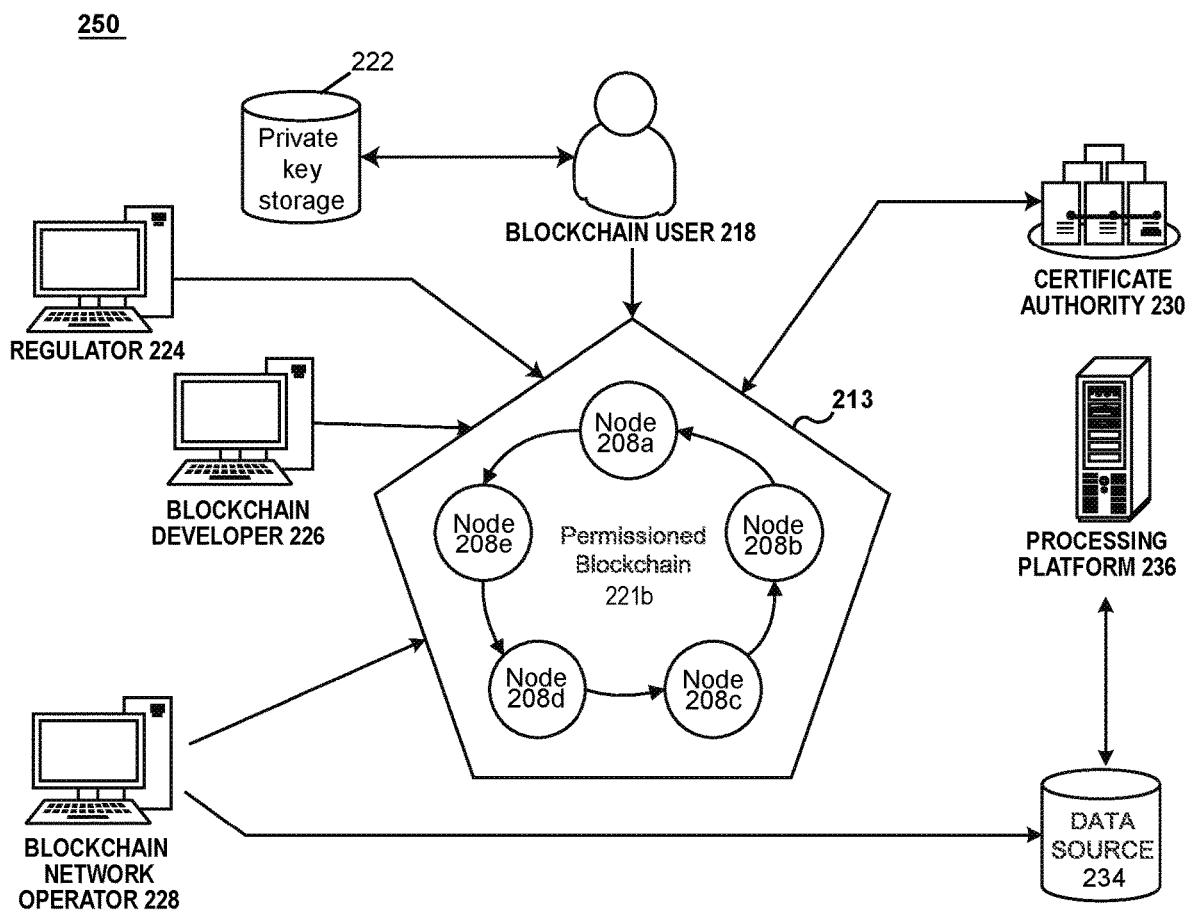
FIG. 2C depicts a functional block diagram describing alternative embodiment of a permissioned blockchain, in accordance with the present disclosure.

FIG. 2C illustrates an alternative embodiment of a permissioned blockchain environment 250, which features a distributed, decentralized peer-to-peer architecture. In this embodiment, a blockchain user 218 may submit a blockchain transaction to the permissioned blockchain 221b. In this example, the transaction can be a deploy, invoke, or query request and may be issued through a client-side application leveraging an SDK, directly through an API, etc. The permissioned blockchain 221b may provide access to a regulator 224, such as an auditor. A blockchain network operator 228 manages member permissions, such as enrolling the regulator 224 as an "auditor" and the blockchain user 218 as a "client." An auditor could be restricted only to querying the ledger whereas a client could be authorized to deploy, invoke, and query certain types of chain code. A blockchain developer 226 writes chain code and client-side applications. The blockchain developer 226 can deploy chain code directly to the network through an interface. To include credentials from a traditional data source 234 in chain code, the blockchain developer 226 could use an out-of-band connection to access the data. In this example, the blockchain user 218 connects to the network through a peer node 208a. Before proceeding with any transactions, the peer node 208a retrieves the user's enrollment and transaction certificates from the certificate authority 230. In some cases, blockchain users must possess these digital certificates in order to transact on the permissioned blockchain 221b. Meanwhile, a user attempting to utilize chain code may be required to verify their credentials on the traditional data source 234. To confirm the user's authorization, chain code can use an out-of-band connection to this data through a traditional processing platform 236.

In embodiments of a permissionless blockchain environment 200, and in some permissioned blockchain environments 220, 250 utilizing an order-execute model, one or more guardians 201 may be available to co-sign transactions submitted by the blockchain user of a sending device 202. Guardians may be third party users and/or automated services that are delegated by the blockchain user 218 to act as a third-party approver of a transaction. Transactions co-signed with a guardian's key may override determinations made by trained classifiers of the blockchain environments 200, 220, 250. The blockchain user may register with the blockchain network 206, 221a, 221b, the user's public key for a set number of transactions (t) along with public keys corresponding to one or more of the guardians 201. Embodiments of the private key belonging to each guardian 201 may be stored offline, outside of the blockchain network 206, 221a, 221b; for example, in guardian key storage 205 as shown in FIG. 2A.

In some embodiments, blockchain users may pre-emptively contact guardians 201 to co-sign transactions using the stored private keys when the blockchain user might expect a transaction to be classified as suspicious by a classifier trained by the blockchain environment 200, 220, 250. For instance, where the transaction might be sending money to a new party that is not part of the user's transaction history, a recipient is receiving an amount significantly more than usual transactions previously performed by the blockchain user and/or any other types of anomalies that may result in a "suspicious" classification. The blockchain user may contact one of the guardians 201 and request the guardian 201 to co-sign a transaction out of band. The guardian 201 can co-sign the request and submit the request directly to the blockchain network 206, 221a, 221b on behalf the of the blockchain user. In other embodiments, the guardian 201 may return the co-signed request to the sending device 202, for submission directly by the sending device 202 or the blockchain user 218, to the blockchain network 206, 221a, 221b.

In some instances, a blockchain user may not anticipate the blockchain network's trained classifier to classify the transaction as suspicious. For example, where the submitted request coincides with a number of previously verified transactions within the user's transaction history. However, even where a requested transaction perfectly resembles other transactions of the blockchain user's transaction history, the classifier may still classify the latest transaction as suspicious; for example, in a situation where too many similar transactions to the same recipient occur over a short period of time. Upon the blockchain user learning that the transaction has not been verified as a valid transaction due to the transaction being classified as suspicious and thus potentially fraudulent, etc., blockchain users may subsequently have the transaction re-submitted a second time once the transaction has been co-signed with one of the guardians' private keys.

Similar to the permissionless blockchain 206 and permissioned blockchains 221a, 221b operating under an order-execute model, permissioned blockchains operating under an execute-order model may incorporate a co-signing mechanism, similar to the guardian 201 signature process discussed above. Instead of using an out-of-band guardian 201 to co-sign a transaction, a plurality of one-time use keys may be created and used by the blockchain user 218 to co-sign requests. In some embodiments, a client accessed by the blockchain user 218 may generate a plurality of one-time use key pairs. The private keys of the key pair can be placed in offline storage, outside of the blockchain network 221a, 221b. For example, in private key storage 222, as shown in FIG. 2B and FIG. 2C. The client registers the public keys of the key pair with the blockchain network 221a, 221b and associates the public keys with the long-term certificate issued by the certificate authority 230.

It should be noted that the implementation of one-time use keys may also be used by permissionless blockchains 206 operating at a small scale. However, under certain circumstances where the sheer number of blockchain wallets using permissionless blockchains 206 becomes too voluminous requiring each blockchain user to store public keys to the, the use of one-time use keys may not scale-up well in a permissionless setting.

Similar to the use of guardian keys, a blockchain user 218 may pre-emptively co-sign a transaction with a one-time use private key stored in private key storage 222 either in anticipation that a submitted transaction may look suspicious and risk being classified as suspicious by the classifier of the blockchain network 221a, 221b or may re-submit classified transactions deemed suspicious by the classifier in order to override the classifier's classification of the transaction. So long as a one-time use key being used to co-sign the submitted transaction has not been used previously, the private key used to co-sign the transaction can override a classifier attempting to invalidate a transaction as being suspicious, fraudulent, etc. Embodiments of the one-time use keys may not be unlimited. A client may generate a limited number of one-time use key pairs at a time. In in some embodiments, additional sets of one-time use keys may be created again upon reaching the last remaining one-time use key. For example, the last remaining public key of the one-time use keys may be used to certify the creation of another set of one-time use keys.

Whether operating within a permissioned or permissionless architecture, embodiments of the nodes 208 of a blockchain network 206, 221a, 221b may function as the communication entities. A "node" may perform a logical function in the sense that multiple nodes of different types can run on the same physical server. Nodes 208 can be grouped in trust domains and can be associated with logical entities that control them in various ways. Nodes 208 may include different types of nodes 208, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes 208, and which implements a delivery guarantee, such as a broadcast to each of the peer nodes in the system when committing transactions and modifying a world state of the blockchain, which may be another name for the initial blockchain transaction and may include control and setup information.

Figure 3A:
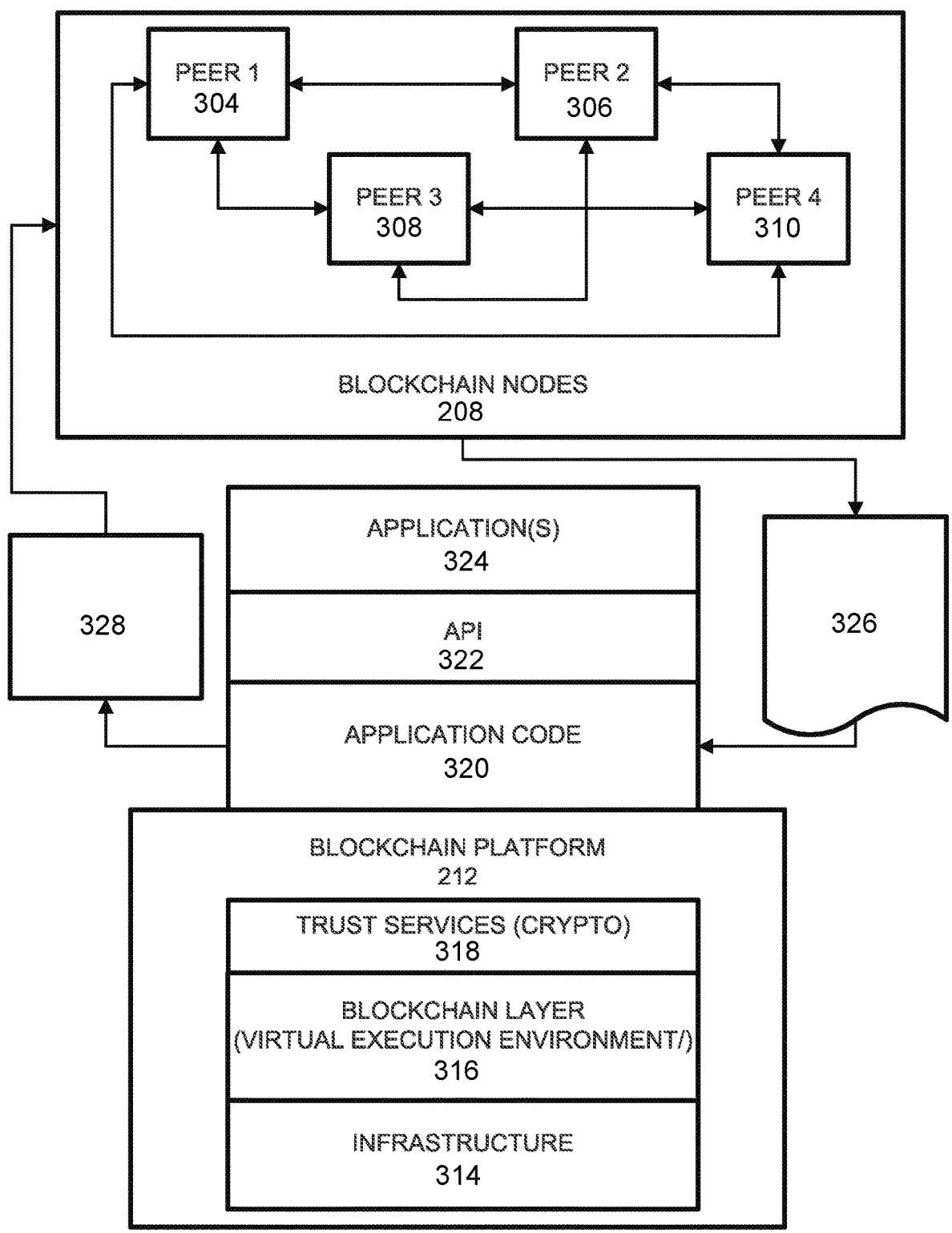
FIG. 3A illustrates an embodiment of a blockchain architecture configuration, in accordance with the present disclosure.

FIG. 3A illustrates an exemplary embodiment of blockchain architecture 300 of a blockchain network 206, 221a, 221b and one or more components thereof. As shown in FIG. 3A, the architecture 300 of a blockchain network 206, 221a, 221b may include certain elements. For example, a group of blockchain nodes 208. The blockchain nodes 208 may include one or more peer nodes 304-310 (also called "peers"). While four peer nodes 304-310 are depicted in FIG. 3A, the number of peer nodes 304-310 are not limited to only four, and any number of peers may be participating in the blockchain network 206, 221a, 221b. The plurality of peer nodes 304-310 may participate in several activities, such as blockchain transaction addition and validation process (consensus). One or more of the peer nodes 304-310 may endorse transactions based on endorsement policy and may provide an ordering service for all blockchain nodes 208 within the architecture 300. Embodiments of a blockchain node 208 may initiate a blockchain request for authentication and seek to write to a blockchain immutable ledger stored in blockchain layer 316, a copy of which may also be stored on the underpinning physical infrastructure 314. The blockchain configuration may include one or more applications 324 which are linked to application programming interfaces (APIs) 322 to access and execute stored program/application code 320 (e.g., chain code, smart contracts, etc.). The applications 324 and application code 320 can be created according to a customized configuration sought by participants and can maintain their own state, control their own assets, and receive external information. These applications 324 executed by a node 208, can be deployed as a transaction and installed, via appending to the distributed ledger, on all peers 304-310 of the nodes 208.

Embodiments of the blockchain platform 212 may include various layers of blockchain data, services (e.g., cryptographic trust services 318, virtual execution environment of a blockchain layer 316, etc.), and underpinning physical computer infrastructure 314 that may be used to receive and store new blockchain transactions for transactions and provide access to auditors which are seeking to access data entries. The blockchain layer 316 may expose an interface that provides access to the virtual execution environment necessary to process the application code 320 and engage the physical infrastructure 314. Cryptographic trust services 318 may be used to verify transactions such as asset exchange transactions and keep information private.

In some embodiments the cryptographic trust services 318 implemented to verify whether transactions are valid or invalid, may be enhanced by incorporating a classifier into the cryptographic trust services 318 and/or the blockchain platform 212 generally. Embodiments of the classifier can be trained using anomaly detection techniques, including pattern recognition, machine learning and artificial intelligence, to classify the blockchain transactions for transactions on the blockchain network 206, 221a, 221b as suspicious, malicious, fraudulent, etc. (generally described herein as "suspicious") requests or valid legitimate transactions. Embodiments of the classifier may be personalized to specific blockchain users requesting transactions on the blockchain network 206, 221a, 221b by building personalized transaction histories for each blockchain user in order to train the classifier to recognize requests that are suspicious or fraudulent based on the blockchain user's history of transactions. The trained classifier can be deployed during validation of transactions to identify patterns and anomalies that may be considered suspicious, when viewed in comparison with the blockchain user's history of valid transactions.

Figure 4A:
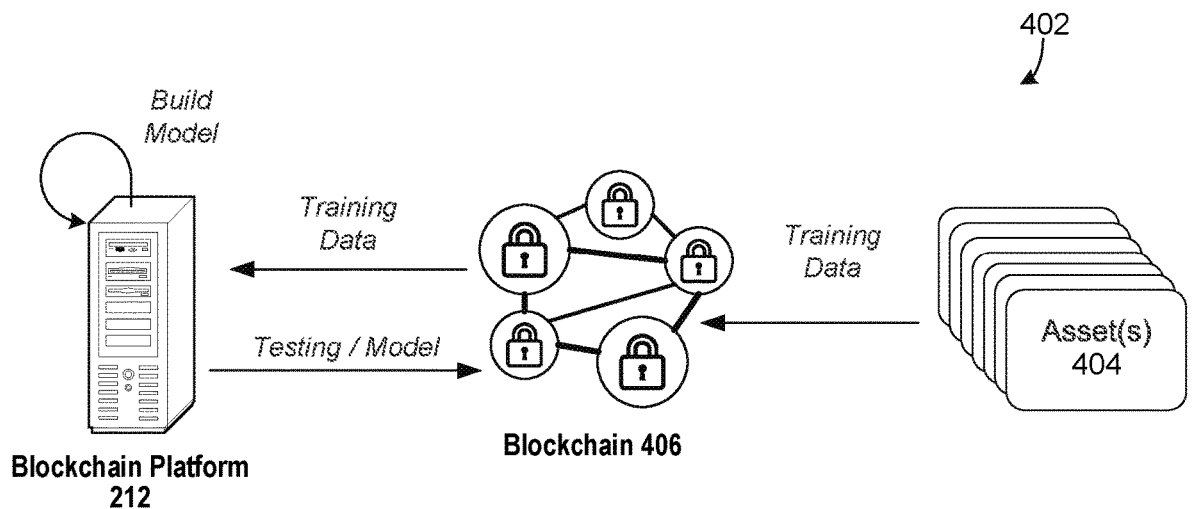
FIG. 4A depicts an embodiment of blockchain being trained during a training phase using machine learning (artificial intelligence) data to classify transactions during verification, in accordance with the present disclosure.
Figure 4B:
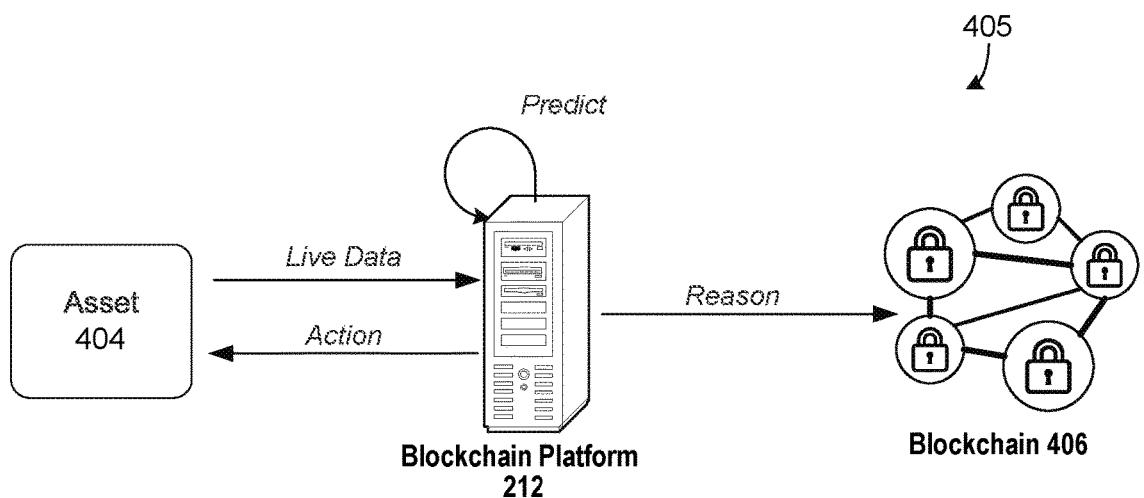
FIG. 4B depicts an embodiment of a blockchain applying machine learning in a live environment using transactional history data of a blockchain user to classify blockchain transaction, in accordance with the present disclosure.

FIG. 4A depicts a workflow describing an embodiment of a process for training a classifier that may be utilized by the blockchain platform 212 during the validation of blockchain transactions. As shown in the FIG. 4A, during a training phase 402, the blockchain platform 212 builds one or more models for the classifier to classify blockchain transactions submitted to blockchain 406 as being suspicious, fraudulent, etc., or valid using training data which may have known or unknown outcomes (i.e., whether it is known to be a suspicious or a valid transaction). Where the correct outcome of the training data is known, this may be referred to as supervised learner, and where conclusions are drawn about the training data and/or patterns are recognized without knowing the correct outcome, this may be considered unsupervised learning. For example, the blockchain transactions being used as training data may include requests to perform one or more transactions wherein one or more asset(s) 404 are being transferred from the requesting blockchain user to a recipient blockchain user. The asset(s) 404 that are part of the transaction may be any type of tangible or non-tangible asset. Examples of tangible assets may include machines, equipment, devices, vehicles, and other types of physical property, while non-tangible assets may include stocks, currency, digital coins, insurance, intellectual property rights, etc.

In the exemplary embodiment of the present disclosure, the training phase 402 may be established by a party responsible for training the classifier and building the transaction histories of the blockchain users over a set number of transactions. In some instances, blockchain users may submit training data to train the classifier to classify valid transactions and/or invalid transactions that should be deemed suspicious by the classifier. In alternative embodiments, an auditor, or regulator 224 of the blockchain network 221a, 221b may train the classifier. During the training phase 402, the classifier may recognize patterns of anomalies based on the data of the details of the set number of transactions comprising the training data that may indicate that a requested transaction be classified as suspicious compared to other valid transactions within the training data. For example, a classifier may recognize certain addresses and being suspicious and/or recognize a distribution drop in the destination addresses of the requested transactions as being suspicious, whereby assets 404, such as currency, were being sent to a wide variety of addresses and then a series of transactions request an exchange of assets to a small set of target addresses.

Other types of anomalies a classifier may be trained to detect as evidence of a suspicious blockchain request may include transactions requesting an abnormal amount of currency compared to mean or median amounts of currency being transacted by the user, as recorded by the user's transaction history. In some embodiments, the classifier may be trained to recognize abnormal amounts of currency using Markov's inequality or another type of tighter inequality formula. For example, by calculating that the probability of sending a particular amount of currency by the blockchain user is less than or equal to the mean transfer amount for the user divided by the particular amount of currency being sent. Using one-hundred bitcoins as an example of an abnormal amount of currency for a particular user to send, Markov inequality equation may appear as shown below, wherein if the probability of the user sending one-hundred bitcoins in this example is less than or equal to the user's mean transfer amount divided by the value of 100 bitcoins, the classifier may detect this anomaly and classify the transaction as suspicious:

$$\left(P(\text{Sending } 100BTC \lor \text{more}) \leq \frac{Mean transfer amount value}{\text{value of } 100BTC}\right)$$

In some embodiments, the classifier may implement a hard-clustering technique such as K-means clustering as a model to determine, based on the transaction history built during the training phase 402, whether the asset being requested to transfer as part of the requested transaction resides within one of the clusters or is an outlier. Where the asset 404 being requested for transferal resides outside of a data clusters built from the transaction history for the user, the requested transaction may be classified as suspicious by the classifier. In other embodiments, the classifier may implement a soft-clustering technique wherein the value of the assets 404 and a computed probability of the assets residing within any of the clusters are analyzed. An example of a soft-clustering technique may be a Gaussian Mixture model. transactions received by the blockchain may be analyzed by the classifier using Gaussian Mixture model. The classifier may calculate the probability of the requested asset's value residing within any of the clusters of the transaction history, and plotting the data onto the Gaussian Mixture model. Where the probability of the asset value being transferred, based on the user's history, is less than a threshold probability value, the transaction may be classified as suspicious by the classifier.

In some embodiments, the classifier may be trained to detect anomalies with a transaction, wherein the assets 404 are requested to be sent to one or more suspicious addresses. For example, by constructing a circulation graph for assets 404 describing a user's transaction history for sending and receiving assets from one or more addresses. A request for a transaction where assets have neither been sent or received from the address may indicate a suspicious request for a transaction. This type of scenario may only be particularly a problem when the address for the requested transaction is for a fresh wallet. However, such a suspicious address anomaly can be alleviated by asset exchanges, such as cryptocurrency exchanges, whereby the exchange may require a one-time two-factor verification step to be completed upon registration of a blockchain user with the asset exchange.

Training of the model for the classifier using training data may take rounds of refinement and testing by the blockchain platform 212. Each round of training may be based on additional data or data that was not previously considered in order to help expand the knowledge of the model for classifying transactions. During training phase 402, different training and testing steps (and the data associated therewith) may be stored on the blockchain 406 by the blockchain platform 212. Each refinement of the classifier's model (e.g., changes in variables, weights, etc.) may or may not be stored on the blockchain 406, providing verifiable proof of how the model for the classifier was trained and the training data that was used to train the classifier. Furthermore, when the blockchain platform 212 has achieved a finally trained model, the resulting classifier and model may be stored on the blockchain 406 for use during live transactions to classify the transactions.

Embodiments of a fully trained classifier may be deployed to a live environment 405 where the classifier can make predictions/decisions based on the execution of the final trained model that takes into account the personalized user transaction history. For example, in live environment 405, the classifier may be deployed to classify whether a transaction to deliver an inordinate amount of cryptocurrency to a small band of the same addresses over a short period of time. In this example, data fed back from the asset 404 may be inputted into the classifier's model and used by the classifier to predict whether the requested transaction is valid or suspicious. Determinations made by the classifier at the blockchain platform 212 may be stored on the blockchain 406 to provide auditable/verifiable proof of the transaction's classification and whether the transaction was invalid or valid during verification of the transaction. The data behind the classifier's decision may be stored by the blockchain platform 212 on the blockchain 406.

Continuing with the description of the embodiment of blockchain architecture 300 of FIG. 3A, blockchain program or application code 320 may be executed via one or more interfaces exposed and/or services provided by the blockchain platform 212. The blockchain's application code 320 may control one or more assets 404 of the blockchain network 206, 221a, 221b. For example, the application code 320 may store and transfer data, and may be executed by peer nodes 304-310 in the form of a smart contract and associated chain code with conditions or other code elements subject to its execution. The smart contracts can themselves be used to identify rules associated with authorization and access requirements and usage of the ledger. For example, processing transactions in view of user transaction history 326 using one or more processing entities (e.g., virtual machines) included in the blockchain layer 316 to classify a transaction. The classification results 328 may include classification of the transaction as "legitimate", "suspicious" and/or variations thereof, such as "valid", "malicious", "fraudulent", etc. "The physical infrastructure 314 may be utilized to retrieve any of the data or information described herein.

In some cases, specialized chain codes may exist for management functions and parameters which are referred to as system chain code (such as managing an ordering/serialization of transactions to be committed to a blockchain network). In some embodiments, the method, system, and/or computer program product can further utilize smart contracts that are trusted distributed applications which leverage tamper-proof properties of the blockchain database and an underlying agreement between nodes 208, which may be referred to as an endorsement or endorsement policy. An endorsement policy may allow chain code to specify endorsers for a transaction in the form of a set of peer nodes 304-310, that may be necessary for endorsement. When a client sends the transaction to the peers (e.g., endorsers) specified in the endorsement policy, the transaction is executed to validate the transaction. After validation, the transactions may enter an ordering phase in which a consensus protocol is used to produce an ordered sequence of endorsed transactions grouped into blocks.

A smart contract may be created via a high-level application and programming language, and then written to a block in the blockchain. The smart contract may include executable code which is registered, stored, and/or replicated with a blockchain (e.g., distributed network of blockchain peers). A transaction may be an execution of the smart contract code which can be performed in response to conditions associated with the smart contract being satisfied. The execution of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols. Embodiments of a smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chain code may include the code interpretation of a smart contract, with additional features. As described herein, the chain code may be program code deployed on a computing network, where it is executed and validated by chain validators together during a consensus process. The chain code receives a hash and retrieves from the blockchain a hash associated with the data template created by use of a previously stored feature extractor. If the hashes of the hash identifier and the hash created from the stored identifier template data match, then the chain code sends an authorization key to the requested service. The chain code may write to the blockchain data associated with the cryptographic details.

Figure 3B:
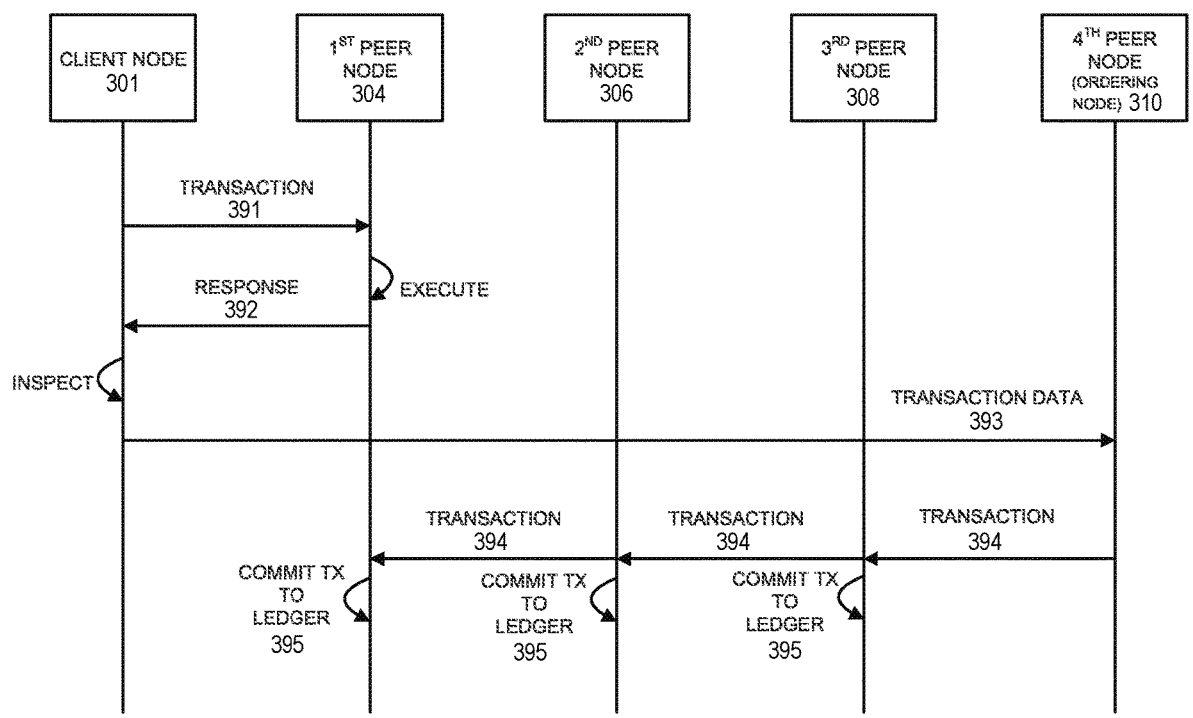
FIG. 3B illustrates an embodiment of a blockchain transactional flow in accordance with the present disclosure.

FIG. 3B illustrates an example of an execute-order model of a blockchain transactional flow 350, between peer nodes 208 of a blockchain network 206, 221*a*, 221*b*. The execute-order architecture may be used in either permissionless blockchain networks 206 and/or permissioned blockchain networks 221*a*, 221*b*. In an execute-order architecture, transactions are executed (i.e., using chain code in any order (or possibly in parallel) and then, when enough peer nodes 304-310 agree upon the results of the transaction (in accordance with an endorsement policy), the transaction is added to the ledger in an arranged order and disseminated to all of the nodes 208 of the blockchain network 206, 221*a*, 221*b* for validation. Until transactions are added to the ledger, there is no concept of one transaction happening before another. In comparison, under an order-execute model, transactions are ordered first, added to the ledger, and disseminated to all of the peers of the blockchain network 206, 221*a*, 221*b* for execution. Once disseminated, the transactions can be sequentially executed (e.g., using smart contract or chain code) on all of the peers.

The transaction flow in an execute-order architecture, may include a transaction proposal 391 sent by a client node 301 to an endorsing peer node, for example first peer node 304. The endorsing peer node 304 may verify the client signature and execute a chain code function to initiate the transaction. The output may include the chain code results, a set of key/value versions that were read in the chain code (read set), and/or the set of keys/values that were written in chain code (write set). Embodiments of the client node 301 may initiate the transaction proposal by constructing and sending a request to the first peer node 304, which may operate as an endorser. The client node 301 may include an application leveraging a supported software development kit (SDK), which utilizes an available API to generate the transaction proposal 391. The proposal may be a request to invoke a chain code function so that data can be read and/or written to the ledger (i.e., write new key value pairs for assets). The SDK may serve as a vehicle to package the transaction proposal 391 into a properly architected format (e.g., protocol buffer over a remote procedure call (RPC)) and take the client's cryptographic credentials and/or credentials of a co-signing guardian 201 to produce a unique signature(s) for the transaction proposal.

Embodiments of the endorsing peer may verify (a) that the transaction proposal is well formed, (b) the transaction has not been submitted already in the past (replay-attack protection) and/or that the transaction is not classified as suspicious by a classifier, (c) the signature(s) are valid, and (d) that the submitter (client node 301, in this example) is properly authorized to perform the proposed operation on that channel of the blockchain network 206, 221*a*, 221*b*. In some embodiments, during verification by the endorsing peer, the trained classifier may assist the endorsing peer with verification of the transaction proposal 391. In particular, the trained classifier may classify the proposed transaction based on the individualized transaction history of the blockchain user submitting the transaction proposal, which may have been previously used to train the classifier. Where one or more anomalies or recognized patterns by the classifier are detected that would cause the classifier to classify the transaction proposal as suspicious, the endorsing peer may refuse to verify the transaction as valid; for example due to non-compliance with one or more policies of the blockchain network 206, 221*a*, 221*b*, unless the transaction is co-signed by a guardian with a guardian's key (in the case of permissionless blockchain network or a permissioned blockchain operating under an order-execute model) or co-signed with a one-time use key registered with a permissioned blockchain (operating under an execute-order model). Where a transactional proposal is classified as suspicious by the classifier but co-signed by a guardian 201 or a one-time use key, the endorsing peer may verify the transaction as valid.

The endorsing peer node may take the transaction proposal inputs as arguments to the invoked chain code function. The chain code is then executed against a current state database to produce transaction results including a response value, read set, and write set. However, no updates are made to the ledger at this point. In the response 392, the set of values, along with the endorsing peer node's signature is passed back as a proposal response 392 to the SDK of the client 301 which parses the payload for the application to consume. The proposal response 392 may be sent back to the client 301 along with an endorsement signature, if approved.

The application 324 of the client 301 inspects/verifies the endorsing peers' signatures and compares the proposal responses to determine if the proposal response is the same. If the chain code only queried the ledger, the application 324 would inspect the query response and would typically not submit the transaction to the ordering node 284. If the client application 324 intends to submit the transaction to the ordering node 310 to update the ledger, the application 324 determines if the specified endorsement policy has been fulfilled before submitting (i.e., did all peer nodes necessary for the transaction endorse the transaction and does the transaction classification indicate a legitimate transaction). Here, the client 301 may include only one of multiple parties to the transaction. In this case, each client 301 may have their own endorsing node, and each endorsing node will need to endorse the transaction. The architecture is such that even if an application 324 selects not to inspect responses or otherwise forwards an unendorsed transaction, the endorsement policy will still be enforced by peers and upheld at the commit validation phase.

Upon a successful inspection, embodiments of the client node 301 may assemble the endorsements into a payload of transaction data 393 and broadcast it to an ordering node. The ordering node in the example of FIG. 3B can be the fourth peer node 310. The ordering node delivers ordered transactions as blocks to all peer nodes 304-310 on a channel. The ordered transaction may contain the read/write sets, the endorsing peers' signatures, and a channel ID. Before committal to the blockchain, each peer node may validate the transaction. For example, the peers may check the endorsement policy to ensure that the correct allotment of the specified peers have signed the results, review results from the classifier to ensure the transaction proposal 391 is not classified as being suspicious and authenticate one or more signatures (including co-signed signatures of guardians 201 or one-time use keys) of the transaction proposal 391 against the payload of the transaction data 393. In some embodiments, ordering node 310 may not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 310 to all peer nodes 304-308 on the channel. The transactions 394 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 395 each peer node 304-308 appends the block to the channel's chain, and for each valid transaction, the write sets are committed to the current state database. An event is emitted, to notify the client application 324 that the transaction (invocation) has been immutably appended to the chain, as well as to notify whether the transaction was validated or invalidated. Under circumstances wherein the event notifying the client application that the transaction was invalidated, for example because the classifier identified the transaction as suspicious, the transaction may be co-signed in a new transaction by a guardian 201 or a one-time use key stored in private key storage 222 and upon re-submission may override the classifier's classification.

Referring back to the drawings, FIG. 2A, illustrates an exemplary process of a transaction being processed by a permissionless blockchain 206 including a plurality of nodes 208. A blockchain user desires to send payment or some other form of value and/or asset to a recipient via the permissionless blockchain 206. In one embodiment, sending device 202 and recipient device 204 may have digital wallets (associated with the permissionless blockchain 206) that provide user interface controls and a display of transaction parameters. In response, the transaction is broadcast throughout the blockchain 206 to the nodes 208*a*. Depending on the blockchain's network parameters, the nodes verify 210 the transaction based on rules (which may be pre-defined or dynamically allocated) established by the permissionless blockchain 206 creators. For example, this may include verifying identities of the parties involved, etc., ensuring that the classifier has not classified the transaction as being suspicious and wherein the classifier has detected the transaction as suspicious, verifying a presence of a co-signed transaction by guardian 201, overriding the "suspicious" classification, and allowing the transaction to be verified as valid. The transaction may be verified immediately, or it may be placed in a queue with other transactions and the nodes 208 determine if the transactions are valid based on a set of network rules.

In structure 211, valid transactions are formed into a block and sealed with a lock (hash). This process may be performed by mining nodes among the nodes 208. Mining nodes may utilize additional software specifically for mining and creating blocks for the permissionless blockchain 206. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 206 may include a proof-of-work (PoW) which is a solution to a puzzle derived from the block's header. Although not shown in the example of FIG. 2A, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 214, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 216, the successfully validated block is distributed through the permissionless blockchain 206 and all nodes 208 add the block to a majority chain which is the permissionless blockchain's auditable ledger. Furthermore, the value in the transaction submitted by the sending device 202 is deposited or otherwise transferred to the digital wallet of the recipient device 204.

Embodiments of the present disclosure may be implemented using a cloud computing environment. It should be understood that although this disclosure includes a detailed description of cloud computing, the teachings recited herein are not limited to a cloud computing environment. Rather, embodiments of the present disclosure may be implemented in conjunction with any type of computing environment now known, or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
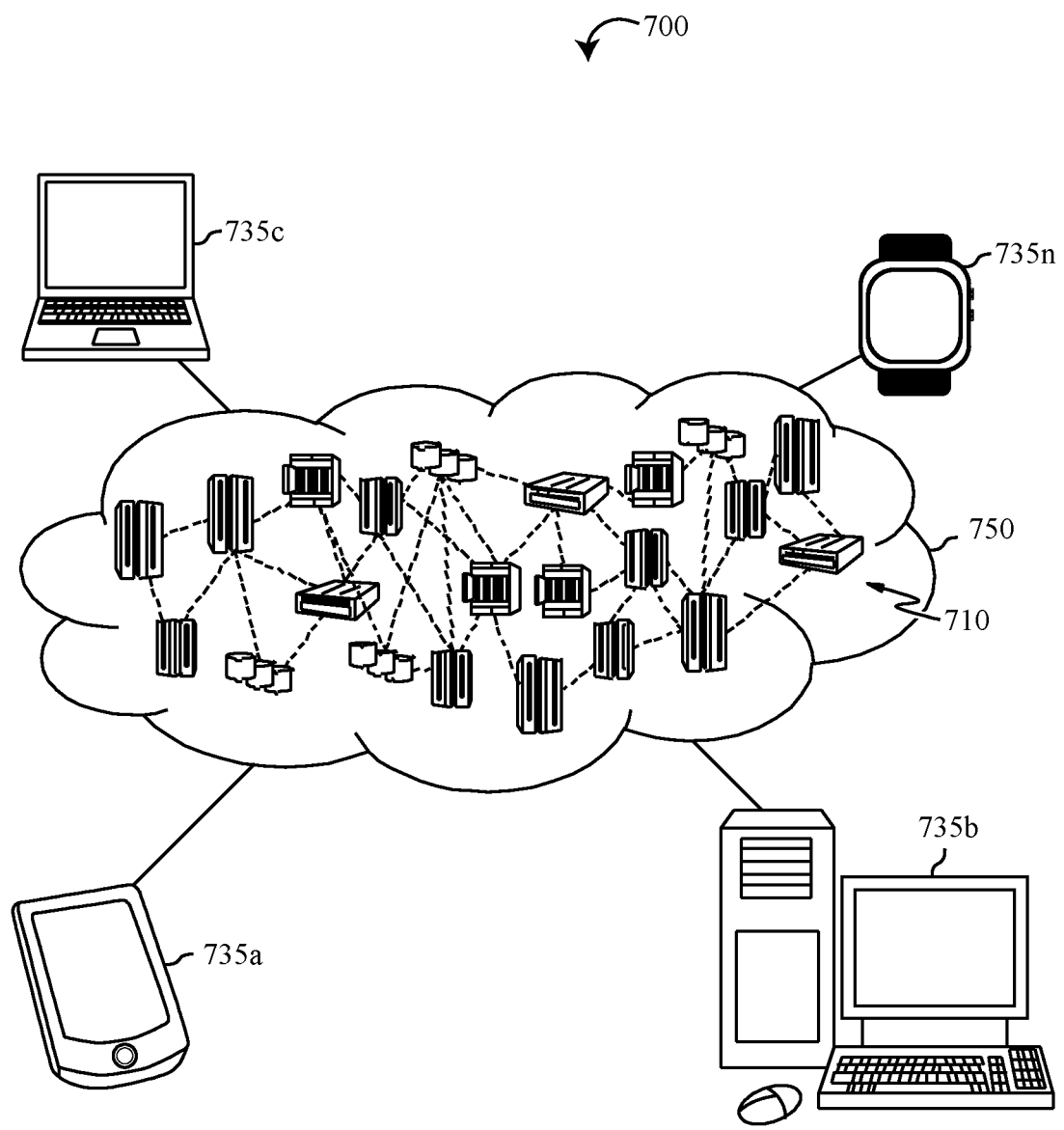
FIG. 7A depicts an embodiment of a cloud computing environment, in accordance with the present disclosure.

Referring to the drawings, FIG. 7A is an illustrative example of a cloud computing environment 700. As shown, cloud computing environment 700 includes one or more cloud computing nodes 710 with which user computing devices 735a-735n and/or client systems may be used by cloud consumers, to access one or more software products, services, applications, and/or workloads provided by the cloud service providers. Examples of the user computing devices 735a-735n are depicted and may include devices such as a smartphone 735a or cellular telephone, desktop computer 735b, laptop computer 735c, and/or any other computing device including non-traditional computing devices such as internet-enabled smart devices, and IoT devices, such as the smartwatch 735n depicted in FIG. 7A. Nodes 710 may communicate with one another and may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of user computing devices 735a-735n shown in FIG. 7 are intended to be illustrative only and that computing nodes 710 and cloud computing environment 700 can communicate with any type of computerized device over any type of network 750 and/or network addressable connection (e.g., using a web browser).

Figure 7B:
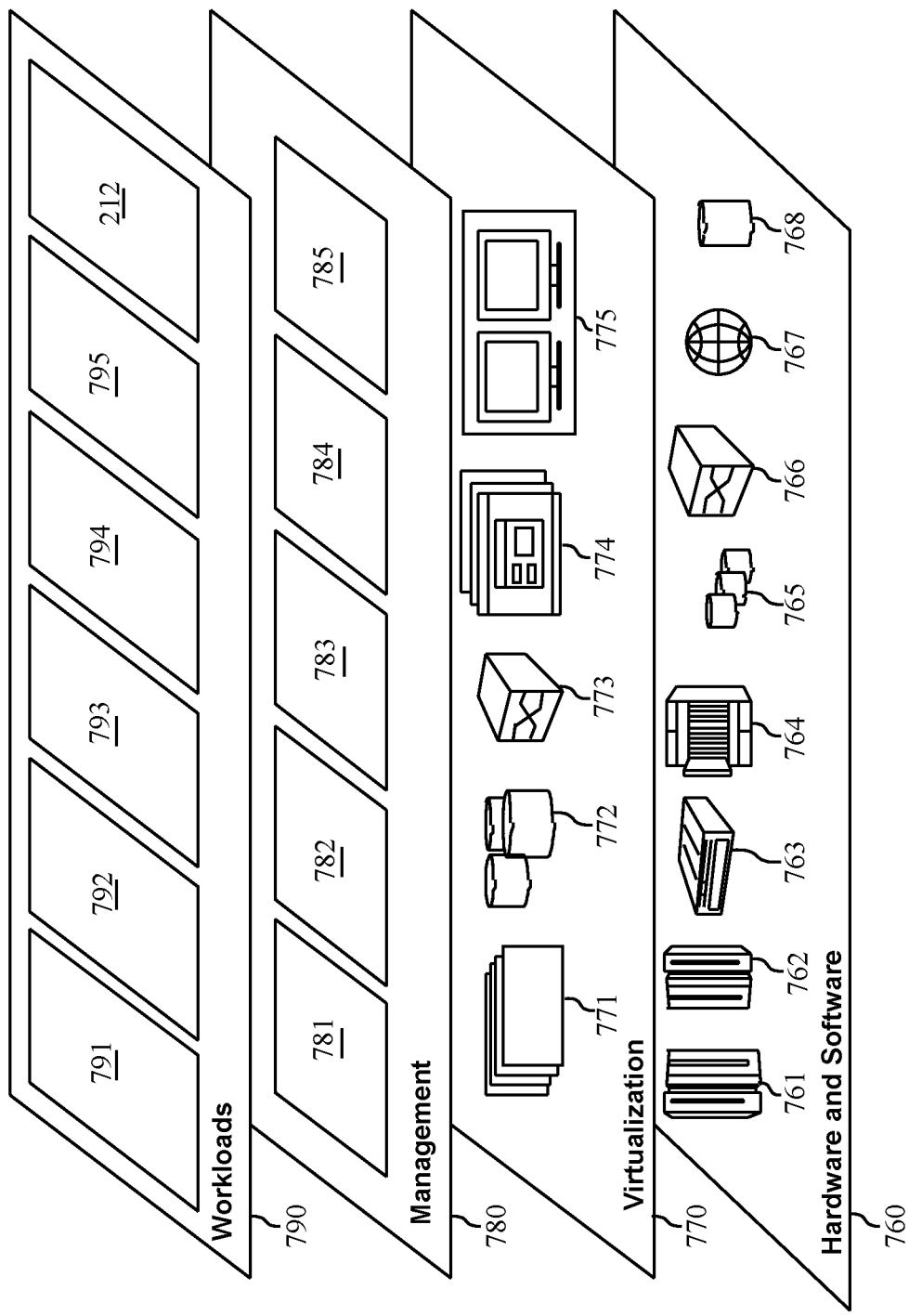
FIG. 7B depicts an embodiment of abstraction model layers of a cloud computing environment, in accordance with the present disclosure.

Referring now to FIG. 7B, a set of functional abstraction layers provided by the cloud computing environment 700 are shown. It should be understood in advance that the components, layers, and functions shown in FIG. 7B are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment 700. Metering and pricing 782 provide cost tracking as resources are utilized within the cloud computing environment 700, and billing or invoicing for consumption of these resources. In one example, these resources can include application software licenses. Security provides identity verification for cloud consumers and tasks, as well as protection for data and other resources. User portal 783 provides access to the cloud computing environment 700 for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: software development and lifecycle management 791, data analytics processing 792, virtual classroom education delivery 793, transaction processing 794; multi-cloud management 795 and blockchain platform 212.

Method for Validating a Blockchain Transaction

Figure 5:
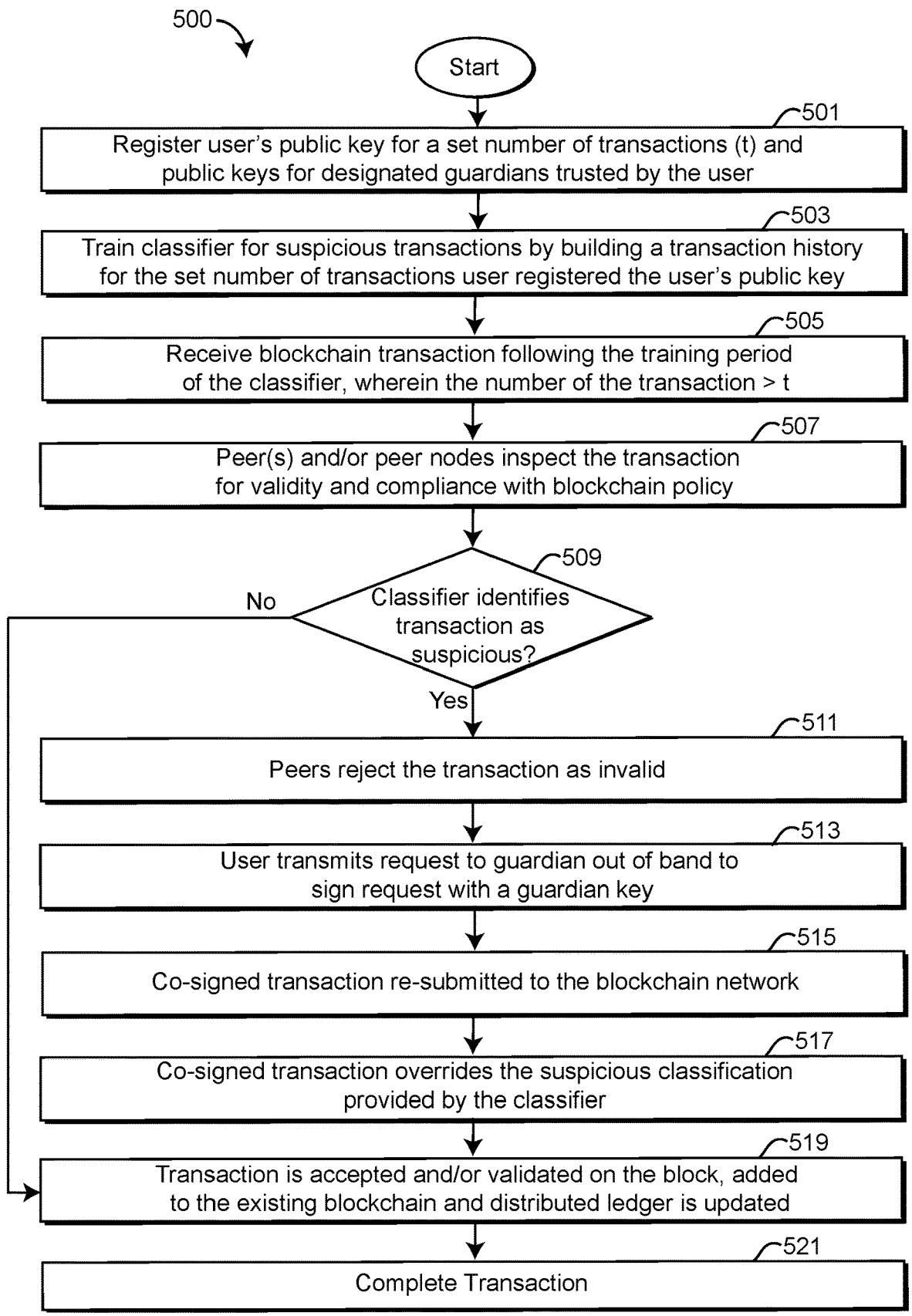
FIG. 5 depicts a flow diagram describing an embodiment of a method for verifying a requested transaction on a permissionless blockchain network or a permissioned blockchain network utilizing an order-execute model.
Figure 6:
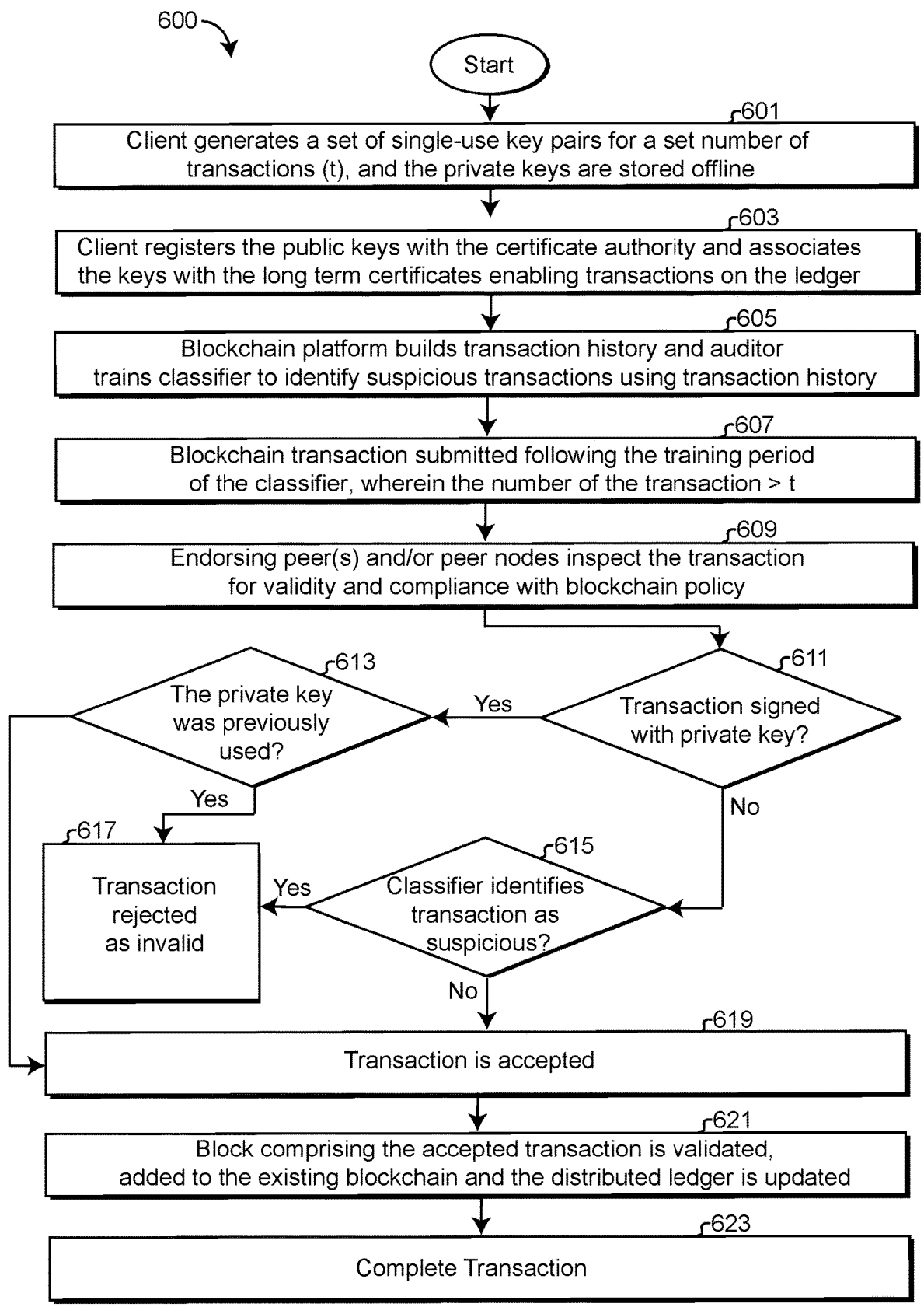
FIG. 6 depicts a flow diagram describing an embodiment of a method for verifying a requested transaction on a permissioned blockchain network utilizing an execute-order model.

The drawings of FIGS. 5-6 represent embodiments of algorithms for validating blockchain transactions and preventing suspicious blockchain transactions from being validated, as described in accordance with FIGS. 2A-4B above, using one or more computing systems defined generically by computing system 100 of FIG. 1, and more specifically by the embodiments of specialized computer systems depicted in FIGS. 2B-4B and as described herein. A person skilled in the art should recognize that the steps of the method described in FIGS. 5-6 may be performed in a different order than presented and may not require all the steps described herein to be performed. Rather, some embodiments may alter the methods by using one or more of the steps discussed below.

FIG. 5 presents a flowchart illustrating an algorithm 500 for validating blockchain transactions in a permissionless blockchain environment 200 or a permissioned blockchain environment 220, 250 operating under an order-execute model, in accordance with the embodiments of the present disclosure. The embodiment of the algorithm 500 may begin at step 501. During step 501, a blockchain user 218 registers a public key for a set a number of transactions (t), and further registers a public key for each guardian 201 approved to co-sign the blockchain user's transactions. For example, if the set number of transactions being used to train the classifier is 10 transactions, then the transaction history built using the ten transactions where, the number of transaction, t=10.

In step 503, the blockchain platform 212, 213 trains a classifier using machine learning, learning techniques to classify transactions being requested for execution by the blockchain network 206, 221a, 221b. In particular, embodiments of the classifier may be trained to classify transactions as valid transactions and/or suspicious transactions which may be fraudulent or malicious and should be treated by the blockchain network 206, 221a, 221b as invalid. The classifier may be trained using training data during a training phase 402 for the designated number of transactions described in step 501, to build a model using the transaction history and detect one or more anomalies in subsequent live transactions using one or more anomaly detection techniques known in the art and/or described in detail in this application. Embodiments of the training phase 402 may be longer or shorter depending on the designated set number of transactions registered with the blockchain network 206, 221a, 221b to train the classifier. For example, where the transaction length for the set number of transactions, t=10 transactions, the transaction history for training the classifier using the user's blockchain history may be 10 transactions long to sufficiently create a model of transaction history for the blockchain user, whereas, if a blockchain user registers a set number of transactions that is 100 transactions in length, t=100 and 100 transactions may be used to train the classifier and build a model of the personalized blockchain history for the blockchain user 218. Upon completion of building a transaction history the length oft as designated in step 501, the classifier can be used in a live environment to classify blockchain transactions.

In step 505, a client node 301 of the blockchain network 206, 221a, 221b may receive a transaction from a blockchain user 218 proposing a transaction to be performed and recorded to the ledger of the blockchain network 206, 221a, 221b. A check may be performed by the classifier to determine whether the transaction is training the classifier or a live transaction. For example, where the number of the transaction being processed is greater than the set number of transactions registered with the blockchain network in step 501 (i.e., transaction number for the blockchain user>t), the blockchain transaction may be considered a live transaction for classification by the classifier. In step 507, the peer(s) and/or the peer nodes of the blockchain network 206, 221a, 221b may inspect the transaction for validity and may accept the transaction as valid. In step 509, a determination is made by algorithm 500 whether or not the classifier has identified the inspected transaction as suspicious. If the classifier identifies that transaction as not being suspicious and/or the transaction is co-signed by a valid guardian 201 key, the algorithm 500 may proceed to step 519, wherein the transaction is accepted and/or validated. Conversely, where the classifier has identified the transaction as being suspicious, for example, due to the detection of one or more anomalies, and the transaction has not been co-signed by a guardian, the algorithm 500, may proceed to step 511.

During step 511, the peers of the blockchain network 206, 221a, 221b may reject the transaction as invalid. The rejection and/or invalidation of the transaction may be reported back to the blockchain user 218 and/or the sending device 202 that submitted the initial request. In step 513, a blockchain user may contact one or more guardians 201 and make an out-of-band request to the guardian 201 to co-sign the transaction. Embodiments of the guardians 201 may co-sign the received transaction, using a private guardian key stored in an offline wallet such as guardian key storage 205. During step 515, in some embodiments, the guardian 201 may transmit the co-signed transaction to the blockchain network 206, 221a, 221b. In other embodiments, the co-signed transaction may be reverted back to the blockchain user 218 or the sending device 202 for re-submission back to the blockchain network 206, 221a, 221b.

In step 517, during the validation phase of the blockchain transactional flow, the inspection of the co-signed transaction submitted by either the guardian 201 or the blockchain user 218, overrides a suspicious classification of the trained classifier. In step 519, the transaction submitted to the blockchain network 206, 221a, 221b is validated by the peers on the block as a valid transaction, wherein the valid transaction is added to the existing blockchain and the distributed ledger is updated. Once updated onto the ledger, the blockchain transaction is considered completed in step 521.

FIG. 6 presents a flowchart illustrating an algorithm 600 for validating blockchain transactions in a permissioned blockchain environment 220, 250 operating under an order-execute model, in accordance with the embodiments of the present disclosure. The embodiment of the algorithm 500 may begin at step 601. During step 601, a client accessed by blockchain user 218 may generate a set number of single-use key pairs valid for a set number of transactions. The client can store the private keys of the key pair in an offline storage area such as private key storage 222. In step 603, the client may register the public keys of the key pairs with a certificate authority 230 of a permissioned blockchain 221a, 221b and may associate the one-time use public keys with the long-term certificates of the permissioned blockchain 221a, 221b, that enable a blockchain user 218 to access the permissioned blockchain 221a, 221b and submit transactions to the ledger.

In step 605, a blockchain platform 213 builds a model of the transaction history for the blockchain user over the course of the set number of transactions designated in step 601 for classifying transactions using a classifier. For example, classifying transactions as "valid" or "legitimate" and/or "suspicious" the classifier may take into account the training over the course of the set number of transactions used to build the transaction history from $T_{i-t}$ to $T_{i-1}$, wherein the $i^{th}$ transaction may be a live transaction or a most recent transaction that is being evaluated and classified by the classifier and "t" is the total set number of transactions within the transaction history. In some instances, the training of the classifier may be performed by a regulator 224 such as an auditor for permissioned blockchain 221a, 221b. The trained classifier may detect one or more recognizable anomalies using machine learning and wherein one or more anomalies for the blockchain user are detected, the classifier may classify the transaction as suspicious using the personalized transaction history of the blockchain user 218 as the basis for the classification.

In step 607, a blockchain transaction is received by blockchain network 221a, 221b following the training period of the classifier. For example, a live transaction environment with the classifier enabled may be as early as the first transaction beyond the set number of transaction "t" used to train the classifier. For instance, if the set number of transactions to train the classifier is t=10 transactions, the classifier may be deployed on the $11^{th}$ transaction, wherein transaction number 11 is greater than t=10. The classifier (C) of transaction suspicion for a transaction (T), may be denoted as C: $T^t \times T \rightarrow \{0,1\}$. For example, A classifier considering a transaction history for $T_1$-$T_{10}$ when classifying an $11^{th}$ transaction $(T_{11})$ wherein 11>10, may be accepted if $C(\{T_{i-1}, T_{i-2} \ldots T_{i-t}\}, T_{11})=1$. Otherwise, where $C(\{T_{i-1}, T_{i-2} \ldots T_{i-t}\}, T_{11})=0$, the transaction may be classified as suspicious when evaluating live data of a transaction, in view of the transaction history built during step 607.

In step 609, the endorsing peer(s) and/or the peer nodes of the blockchain network 221a, 221b may inspect the transaction for validity and may accept the transaction as valid and/or endorse the transaction. For example, an endorsing peer may check for valid signature on the transaction and/or may endorse the transaction if the transaction complies with an allowable transaction classification as identified by a classifier. For example, where the endorsement policy requires that endorsing peers sign transactions that are considered legitimate transactions by the classifier and not suspicious, fraudulent, or malicious transactions. For example, during the inspection period peers may check whether or not the transaction is co-signed with a one-time use private key, determine whether the one-time use key has been previously used and/or whether or not classifier has identified the transaction as suspicious or legitimate.

In step 611, a determination is made whether or not the transaction is co-signed with a one-time use key created in step 601. If the transaction is not signed with a private key, algorithm 600 proceeds to step 615. If, however, the transaction is signed with a one-time use key, an additional determination may be made in step 613 whether the one-time use key has already been used. In a situation where the one-time use key has already been used, the algorithm may proceed to step 617, and the transaction may be rejected as invalid. Otherwise, in a situation where the co-signed one-time use key is valid and has not been previously used, the algorithm 600 may proceed to step 619 and accept the transaction. Conversely, where the transaction has not been co-signed with a one-time use key, a determination is further made in step 615 whether not the classifier has identified the submitted transaction as suspicious, in view of the transaction history for the blockchain user 218. In step 615, where the classifier identifies the transaction as suspicious, the algorithm may proceed to step 617, and the transaction is not accepted and may be rejected as invalid on the blockchain. Likewise, in step 615 wherein the classifier classifies the transaction as legitimate, the algorithm may proceed to step 619 wherein the transaction is accepted and the blockchain transactional flow continues to validate the transaction in step 621 and the completes the transaction in step 623.

What is claimed is:

1. A computer system for validating a blockchain transaction comprising:
   a processor; and
   a computer-readable storage media coupled to the processor, wherein the computer-readable storage media contains program instructions executed by the processor comprising:
   registering a set of public keys corresponding to a set number of transactions;
   training a classifier with a pattern recognition algorithm to detect anomalies indicating suspicious blockchain transactions, using the set number of transactions to build a transaction history;
   receiving the blockchain transaction; and
   inspecting the blockchain transaction using the classifier trained to detect the anomalies indicating the suspicious blockchain transactions, wherein upon identifying the blockchain transaction is classified as a suspicious blockchain transaction and the blockchain transaction classified as the suspicious blockchain transaction is co-signed by a private key with a corresponding public key registered as part of the set of public keys, the blockchain transaction is accepted.

2. The computer system of claim 1, wherein registering the set of public keys includes registering a public key of a designated guardian party trusted to approve and co-sign the blockchain transaction and wherein the suspicious blockchain transaction co-signed by the public key includes the public key of the designated guardian party.

3. The computer system of claim 2, wherein receiving the blockchain transaction comprises:
   receiving from the designated guardian party, the blockchain transaction co-signed by the designated guardian party out of band of a blockchain network receiving the blockchain transaction.

4. The computer system of claim 2, wherein the computer system receiving the blockchain transaction is operating in a permissionless blockchain environment or an order-execute model of a permissioned blockchain environment.

5. The computer system of claim 1, wherein registering the set of public keys includes registering a set of one-time use public keys with certificate authority for a blockchain receiving the request, and wherein the suspicious blockchain transaction co-signed by the private key includes a one-time use public key of the set of one-time use public keys and a one-time use private key corresponding to the one-time use public key as a key pair.

6. The computer system of claim 5, further comprising:
   confirming whether the key pair has been previously used to validate another blockchain transaction, wherein upon confirming the public key has not been previously used to validate another blockchain transaction, validating the blockchain transaction.

7. The computer system of claim 5 wherein the computer system receiving the blockchain transaction is operating in an execute-order model of a permissioned blockchain environment.

8. A computer-implemented method for validating a blockchain transaction comprising:
   registering a set of public keys corresponding to a set number of transactions;

training a classifier with a pattern recognition algorithm to detect anomalies indicating suspicious blockchain transactions, using the set number of transactions to build a transaction history;

receiving the blockchain transaction; and inspecting the blockchain transaction using the classifier trained to detect the anomalies indicating the suspicious blockchain transactions, wherein upon identifying the blockchain transaction is classified as a suspicious blockchain transaction and the blockchain transaction classified as the suspicious blockchain transaction is co-signed by a private key with a corresponding public key registered as part of the set of public keys, the blockchain transaction is accepted.

9. The computer-implemented method of claim 8, wherein registering the set of public keys includes registering a public key of a designated guardian party trusted to approve and co-sign the blockchain transaction and wherein the suspicious blockchain transaction co-signed by the public key includes the public key of the designated guardian party.

10. The computer-implemented method of claim 8, wherein receiving the blockchain transaction comprises:

receiving, from the designated guardian party, the blockchain transaction co-signed by the designated guardian party out of band of a blockchain network receiving the blockchain transaction.

11. The computer-implemented method of claim 9, wherein the blockchain transaction is received by a blockchain network operating in a permissionless blockchain environment or an order-execute model of a permissioned blockchain environment.

12. The computer-implemented method of claim 8, wherein registering the set of public keys includes registering a set of one-time use public keys with certificate authority for a blockchain receiving the request, and wherein the suspicious blockchain transaction co-signed by the private key includes a one-time use public key of the set of one-time use public keys and a one-time use private key corresponding to the one-time use public key as a key pair.

13. The computer-implemented method of claim 12, further comprising:

confirming whether the key pair has been previously used to validate another blockchain transaction, wherein upon confirming the public key has not been previously used to validate another blockchain transaction, validating the blockchain transaction.

14. The computer-implemented method of claim 12, wherein the blockchain transaction is received by blockchain network operating in an execute-order model of a permissioned blockchain environment.

15. A computer program product for validating a blockchain transaction comprising:

one or more computer readable storage media having computer-readable program instructions stored on the one or more computer readable storage media, said program instructions executes a computer-implemented method comprising:

registering a set of public keys corresponding to a set number of transactions;

training a classifier with a pattern recognition algorithm to detect anomalies indicating suspicious blockchain transactions, using the set number of transactions to build a transaction history;

receiving the blockchain transaction; and inspecting the blockchain transaction using the classifier trained to detect the anomalies indicating the suspicious blockchain transactions, wherein upon identifying the blockchain transaction is classified as a suspicious blockchain transaction and the blockchain transaction classified as the suspicious blockchain transaction is co-signed by a private key with a corresponding public key registered as part of the set of public keys, the blockchain transaction is accepted.

16. The computer program product of claim 15, wherein registering the set of public keys includes registering a public key of a designated guardian party trusted to approve and co-sign the blockchain transaction and wherein the suspicious blockchain transaction co-signed by the public key includes the public key of the designated guardian party.

17. The computer program product of claim 16, wherein a blockchain network receiving the blockchain transaction is operating in a permissionless blockchain environment or an order-execute model of a permissioned blockchain environment.

18. The computer program product of claim 15, wherein registering the set of public keys includes registering a set of one-time use public keys with certificate authority for a blockchain receiving the request, and wherein the suspicious blockchain transaction co-signed by the private key includes a one-time use public key of the set of one-time use public keys and a one-time use private key corresponding to the one-time use public key as a key pair.

19. The computer program product of claim 18, further comprising:

confirming whether the key pair has been previously used to validate another blockchain transaction, wherein upon confirming the public key has not been previously used to validate another blockchain transaction, validating the blockchain transaction.

20. The computer program product of claim 18, wherein a blockchain network receiving the blockchain transaction is operating in an execute-order model of a permissioned blockchain environment.

\* \* \* \* \*